Feb. 6, 1968   H. SCHOTTLER   3,367,198
VARIABLE SPEED REDUCER MECHANISM
Filed March 9, 1966   3 Sheets-Sheet 3
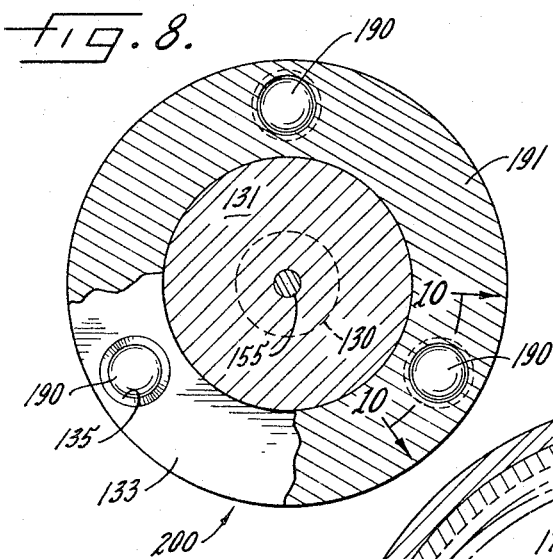
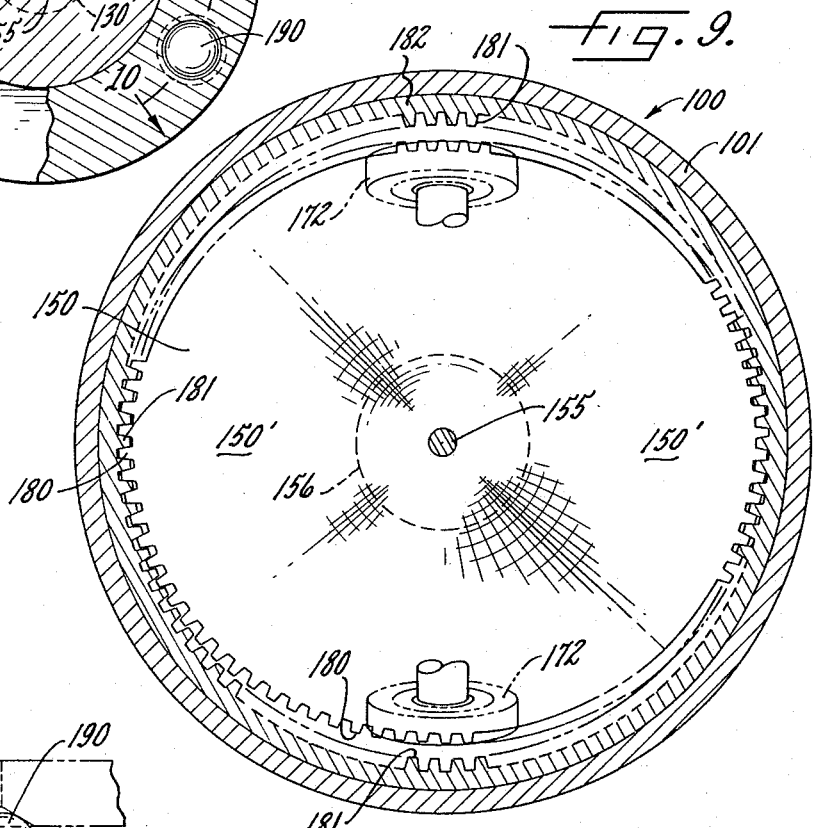
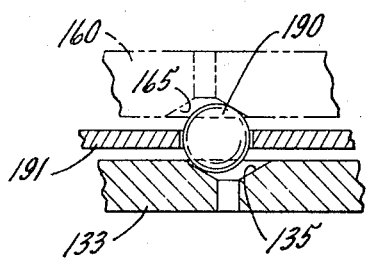
INVENTOR.
Henry Schottler,
BY
Hume, Groen, Clement & Hume
ATTORNEYS.

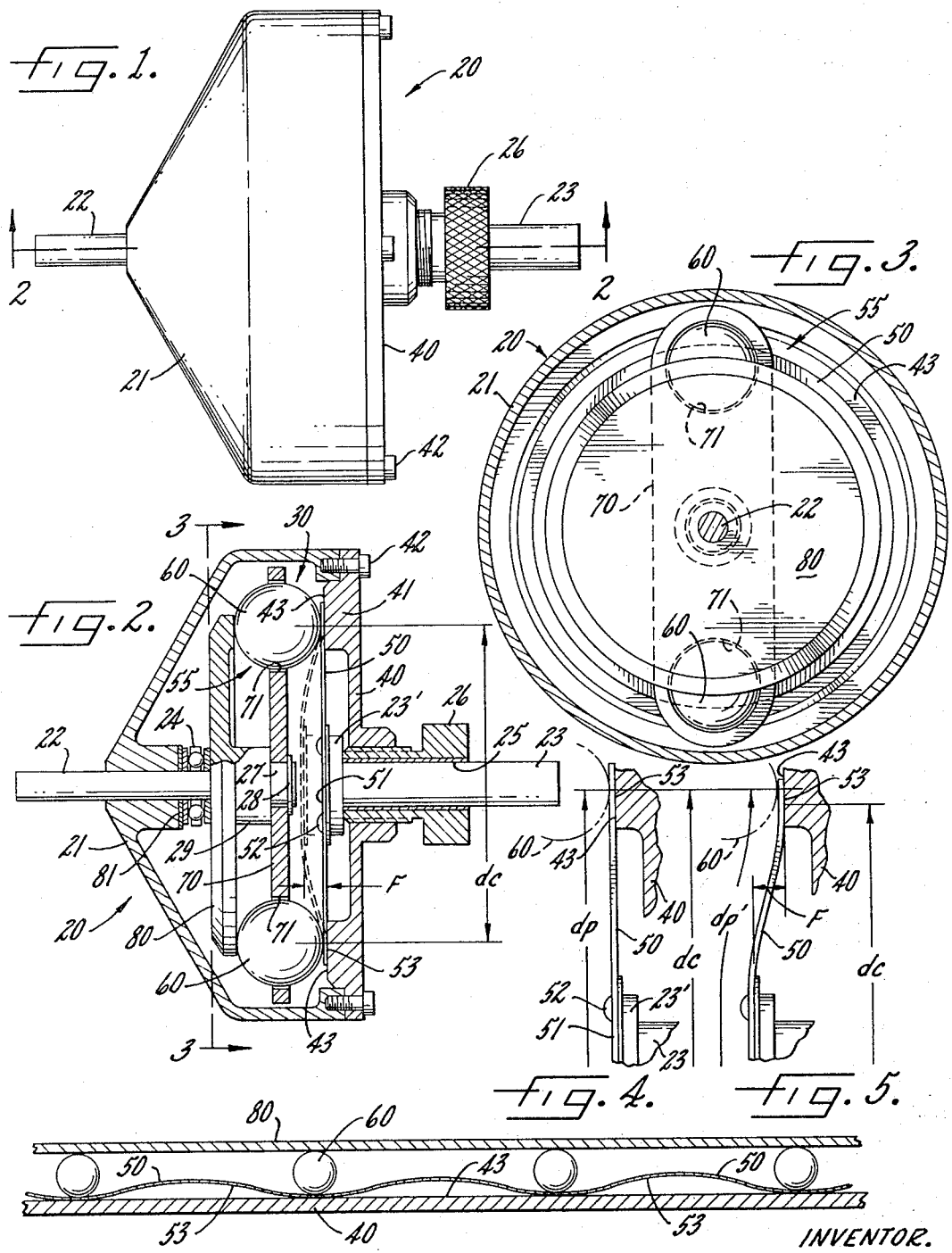

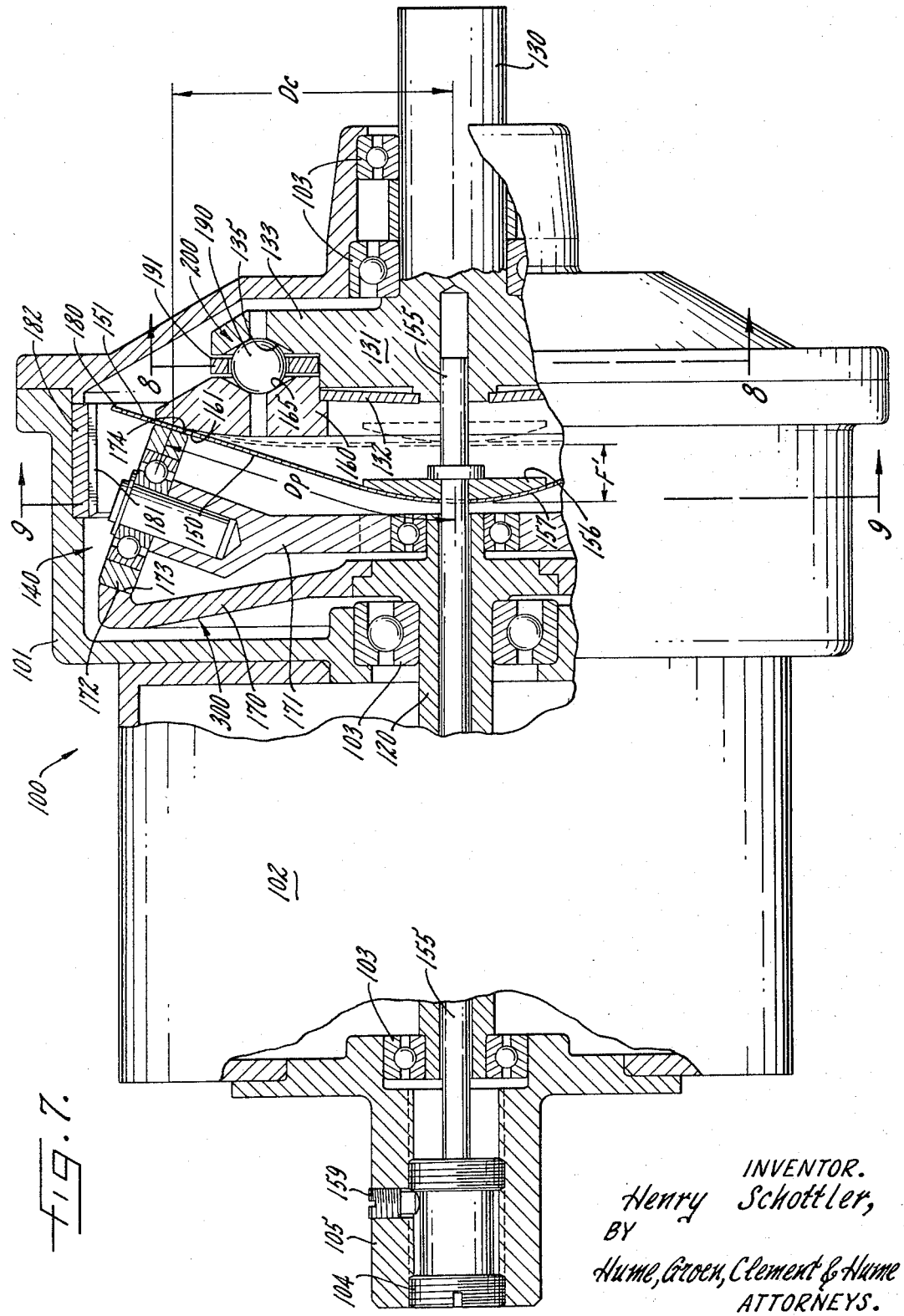

United States Patent Office 3,367,198
Patented Feb. 6, 1968

3,367,198
VARIABLE SPEED REDUCER MECHANISM
Henry Schottler, North Riverside, Ill., assignor to Roller Gear Ltd., Zug, Zug, Switzerland, a corporation of Switzerland
Filed Mar. 9, 1966, Ser. No. 532,964
18 Claims. (Cl. 74—198)

This invention relates generally to speed reducers, and more particularly relates to the drive mechanism of an infinitely variable speed reducing unit.

An object of the invention is to provide a speed reducing unit.

Another object is to provide a speed reducer with a drive mechanism which readily permits the reduction ratio of the unit to be infinitely varied within a chosen speed range.

A further object is to provide an infinitely variable speed reduction unit with a drive mechanism which has very high torque-transmitting characteristics and substantial mechanical efficiency.

An additional object is to provide an infinitely variable speed reduction unit with a drive mechanism which is readily adaptable to the inclusion of means permitting the speed reduction ratio of the unit to remain substantially constant under varying load conditions.

Generally, the invention provides a speed reducer unit with a drive mechanism which transmits torque with substantial mechanical efficiency at a greatly reduced speed. Moreover, the invention provides a drive mechanism for a speed reducer permitting the speed reduction ratio of the unit to be infinitely varied within selected maximum and minimum values, and further permitting the unit to maintain a substantially constant speed reduction ratio under varying load conditions.

Additional objects and features of this invention will become apparent from the following description of embodiments thereof, taken in conjunction with the accompanying drawings, in which:

FIGURE 1 is an elevational view of a speed reducing unit embodying the features of the present invention;

FIGURE 2 is a vertical sectional view of the speed reducer as illustrated in FIGURE 1;

FIGURE 3 is a cross-sectional view taken along the line 3—3 in FIGURE 2;

FIGURE 4 is an enlarged fragmentary view of the speed reducing unit of FIGURE 1, shown in position for transmitting minimum output speed;

FIGURE 5 is an enlarged fragmentary view of the speed reducing unit of FIGURE 1, shown in position for transmitting maximum output speed;

FIGURE 6 is a developed plane view of the transmission members of the speed reducing unit of FIGURE 1;

FIGURE 7 is an elevational view in partial section of another embodiment of a speed reducer embodying the features of the present invention;

FIGURE 8 is a cross-sectional view taken along the line 8—8 in FIGURE 7;

FIGURE 9 is a cross-sectional view taken along the line 9—9 in FIGURE 7; and

FIGURE 10 is a cross-sectional view taken along the line 10—10 in FIGURE 8.

Referring now to FIGURES 1 through 6 of the drawings, there is illustrated an infinitely variable speed reducer embodying the features of the present invention and generally indicated by the reference numeral 20. The drive mechanism of the reducer 20, generally referred to by the reference numeral 30, transmits torque from an input shaft 22 of the unit to an output shaft 23 at a variety of selective speed reduction ratios.

More particularly, the speed reducer 20 has a stationary protective housing 21 and includes standard input and output shafts 22 and 23, respectively. The input shaft 22 is rotatably supported by a thrust bearing 24 within the stationary housing 21, and can be driven at the desired input speed by any suitable power source (not shown) such as an electric motor. Similarly, the output shaft 23 is rotatably supported within the housing 21 by a bushing 25 provided in an adjustable threaded hand nut 26. Any suitable form of coupling may be used to connect this output shaft 23 to a load which is to be driven by the unit 20 at a speed reduced from that of the input shaft 22.

The drive mechanism which transmits the torque of the input shaft 22 to the output shaft 23 at infinitely variable speeds in accordance with this invention is indicated generally by the reference numeral 30 in FIGURE 2. The drive mechanism 30 comprises a set of frictionally engageable transmission members 40 and 50, one of which is in the form of a deformable plate 50, which are forced to rotate with respect to each other by the reoccurring action of a pressure wave generator 55. As illustrated in FIGURE 3, the plate 50 is preferably circular in configuration.

As seen in FIGURE 2, the drive mechanism 30 includes a first transmission member 40 which is rigidly secured by suitable bolts 42 to the stationary housing 21 on the side of the housing adjacent the output shaft 23. This transmission member 40 is provided with a machined boss portion 41 extending into the interior of the reducer housing 21 and defining an annular contact surface 43 concentrically arranged with respect to the output shaft 23.

The drive mechanism 30 further includes a second torque transmission member in the form of an elastically deformable circular disc or plate 50. The plate 50 is preferably constructed from a strong resilient material such as sheet steel and, as shown in FIGURE 2, is preferably positioned within the reducer housing 21 in coaxial arrangement with the input and output shafts 22 and 23. In addition, the central portion 51 of the plate 50 is secured to the output shaft 23, such as by means of rivets 52 connected to a flange 23′ of the output shaft, so that the plate 50 and the shaft 23 in this embodiment will rotate in unison.

By such an arrangement, the circular plate 50 defines a deformable circumferential working area 53 positioned longitudinally adjacent the annular contact surface 43 of the first transmission member 40. The working area 53 of the plate 50 can therefore be brought into engagement with the annular contact surface 43 in a manner which causes the plate 50, and the connected output shaft 23, to rotate with respect to the stationary first transmission member 40. Furthermore, the threaded hand nut 26 can be advanced or retracted within the housing 21, to the left or right respectively in FIGURE 2, to move the output shaft 23 and the connected plate 50 longitudinally within the housing 21. The resulting variation in the longitudinal spacing between the undeformed plate 50 and the first transmission member 40 therefore vary the speed reduction ratio of the speed reducer.

As seen in FIGURES 2 and 3, the drive mechanism 30 further includes a pressure wave generator 55 which is joined to the input shaft 22 and which functions to bring the above-described first and second transmission members 40 and 50 into torque-transmitting engagement. The pressure generator 55 includes a rolling member or ball 60 positioned within the reducer housing 21 longitudinally adjacent the working area 53 of the deformable plate 50. It has been found that the speed reducer 20 in accordance with this invention operates at substantially optimum efficiency with two balls 60 spaced in diametrically-opposed positions, as shown in FIGURES 2 and 3. However, it will be appreciated by those skilled in the art that one or more rolling members could be used, and that the relative circumferential spacing of a plurality of rolling members could be varied as needed for particular applications, without departing from the scope of the present invention.

In order to retain the pressure-generating balls 60 in the desired position within the reducer housing 21, the pressure generator 55 includes a ball retainer 70 which receives the balls 60 in diametrically-spaced ball race apertures 71. If desired, the retainer 70 can be arranged so that it will revolve in unison with and at the same speed as the input shaft 22 of the speed reducer. However, in the preferred arrangement as shown in FIGURES 2 and 3, the retainer 70 is rotatably mounted on the inner end of the input shaft 22 and is constrained from axial movement by a clip ring 28 and an input shaft shoulder 29. The retainer 70 thereby permits the balls 60 to move longitudinally within their respective ball race apertures 71, and further permits the balls to orbit freely about the shaft 22. By this arrangement, the drive mechanism 30 can be provided with a planetary driving system which rotates the balls 60 within the reducer housing 21 at a speed substantially reduced from the speed of the input shaft 22.

In this regard, the pressure generator 55 is provided with a rigid planetary member 80, as shown in FIGURE 2. The planetary member 80 is circular in shape and is securely joined to the input shaft 22 in a manner which brings the member 80 into frictional engagement with the balls 60. Rotation of the input shaft 22 will thereby cause the planetary member 80 to drive the balls 60 in an orbital path around the input shaft 22 at a speed substantially reduced from the speed of the input shaft 22. In the illustrated arrangement, for instance, the planetary member 80 will function to orbit the balls 60 at substantially one-half of the speed of the input shaft 22.

Additionally, the rigid planetary member 80 forceably urges the balls 60 longitudinally against the deformable plate 50, to the right in FIGURE 2, and thereby forces a segment of the plate 50 into frictional engagement with the relatively stationary first transmission member 40. Suitable means such as shims 81 can be provided to maintain the member 80 in the proper longitudinal position, and a compression spring (not shown) could be added to increase the axial force of the member 80 against the balls 60 if desired.

The operation of the speed reducer 20 in accordance with this invention will now be described with reference to FIGURES 2, 4, 5 and 6. Referring initially to FIGURE 2, the input shaft 22 is driven by a suitable power source, such as an electric motor, at the desired input speed. The planetary member 80 secured to the input shaft 22 will thus rotate at the same input speed, and will transmit the torque created by the power source to the balls 60. The balls 60 and the ball retainer 70 are in turn rotated by the frictional engagement between the member 80 and the balls 60, at a speed substantially one-half the speed of the input shaft 22.

Since the member 80 is forceably urging the rotating balls 60 in a longitudinal direction (in a rightward direction as viewed in FIGURE 2), the rotating balls 60 are in rolling engagement with the adjacent surface of the deformable plate 50, and force the segment of the plate 50 adjacent each of the balls into contact with the relatively stationary transmission member 40. The rotating balls 60 therefore generate a pair of revolving pressure waves which force successive segments of the circumferential working area 53 of the plate 50 into frictional engagement with the adjacent annular contact surface 43.

As seen in FIGURE 2, the circular path on the stationary contact surface 43 against which the plate 50 is forced by the rotating balls 60 has a diameter $d_c$. The diameter $d_c$ is defined by the position of the balls 60, and thus remains constant or fixed throughout the speed reducing operation. Of course, the circumferential length of this circular path on contact surface 43, at the fixed diameter $d_c$, also remains fixed at $\pi d_c$. Similarly, the engagement between the plate 50 and the contact surface 43, induced by the balls 60, occurs at a pitch diameter $d_p$ on the plate 50. The circumferential length on plate 50 at the pitch diameter $d_p$ is $\pi d_p$. The revolving pressure wave generated by the orbiting balls 60 therefore forces the circular path $\pi d_p$ of the plate 50 to engage with and travel along the fixed circular path $\pi d_c$ on the annular contact surface 43. Accordingly, each complete revolution of the pressure-generating balls 60 will bring the entire path $\pi d_p$ of the plate 50 into engagement with the path $\pi d_c$ on the stationary contact surface 43.

When the plate 50 is positioned longitudinally adjacent the stationary contact surface 43, as seen in solid lines in FIGURES 2 and 4, the plate 50 will not be deformed by the longitudinal pressure of the balls 60, and the pitch diameter $d_p$ of the plate 50 will be equal to the fixed diameter $d_c$ of the contact surface 43. The lengths of the engaged circular paths of the plate 50 and the surface 43 ($\pi d_p$ and $\pi d_c$) will likewise be equal. The revolving longitudinal pressure wave induced by the rotating balls 60 will not produce any relative motion between the plate 50 and the stationary contact surface 43 where the circumferential lengths of the engaging paths of the plate 50 and the surface 43 are equal. Under such conditions, the speed reducer 20 fails to transmit the motion of the input shaft 22 to the output shaft 23, and the speed reduction ratio of the reducer 20 approaches an infinite value.

In order to produce relative motion between the plate 50 and the contact surface 43, the speed reducer 20 is provided with the adjustable nut 26 which shifts the plate 50 longitudinally with respect to the contact surface 43. As seen in FIGURES 2 and 5, the rotating balls 60 will then deform the plate 50 longitudinally into engagement with the annular contact surface 43 at a pitch diameter $d_p'$ which is larger than the fixed diameter $d_c$ of the contact surface 43. The engaged paths on the plate 50 and the surface 43, $\pi d_p'$ and $\pi d_c$ respectively, will thus have different circumferential lengths. The rotating balls 60 thereby cause rolling contact between these engaging paths of different circumferences, and cause the plate 50 and the transmission member 40 to rotate with respect to each other. FIGURE 6, which is a plane development of the plate 50 and transmission member 40 taken along the pitch diameter $d_p'$ in FIGURE 5, clearly illustrates that the circumferential length of the deformed plate 50 at the pitch diameter $d_p'$ is greater than the circumference of the engaged contact surface 43 at the fixed diameter $d_c$.

From the above description of the speed reducer 20, it is apparent that each complete revolution of the balls 60 through the fixed circumferential distance $\pi d_c$ will therefore rotate the deformed plate 50 with respect to the stationary surface 43 through an arcuate distance equal to $\pi d_p - \pi d_c$. The speed reduction ratio of the co-operating transmission member 40 and the plate 50 is therefore:

$$\pi d_c / \pi d_p - \pi d_c$$

or $$d_c / d_p - d_c$$

Accordingly, the speed reduction ratio of the speed reducer 20 can be changed by varying the relationship between the pitch diameter $d_p$ of the plate 50 and the fixed diameter $d_c$ on the annular contact surface 43.

To accomplish a variation in the speed reduction ratios, the adjustable nut 26 of the reducer 20 is capable of shifting the plate 50 longitudinally from an undeformed position, as shown by the solid lines in FIGURE 2, through a selected operating range F to a position of maximum deflection, as shown in phantom in FIGURE 2. Such longitudinal shifting of the plate 50 increases the amount of deflection of the plate 50 by the balls 60, and therefore increases the plate pitch diameter $d_p$ with respect to the fixed diameter $d_c$ of the surface 43. The adjustable nut 26 is also capable of movably retaining the plate 50 in any longitudinal position within the range F. By this arrangement, the relationship between $d_p$ and $d_c$ and thus the speed reduction ratio of the reducer 20 can be infinitely varied within the operating range F.

This invention therefore provides a speed reducer 20 having a reduction ratio which can be infinitely varied within a predetermined speed range F. In addition, since the contact between the torque-transmitting members in this reducer 20, the plate 50 and the stationary member 40, is a rolling contact rather than frictional sliding, the torque-transmitting characteristics and the mechanical efficiency of this speed reduction unit are more than adequate for most if not all commercial applications.

FIGURES 7 through 10 illustrate a modified speed reducer 100 embodying the features of the present invention, and which operates in substantially the same manner as the embodiment shown in FIGURES 1 through 6. However, the speed reducer 100 is provided with pressure-regulating means, generally indicated by the reference numeral 200, which compensates for varying output load conditions on the reducer 100, and thereby assures that the reducer 100 will operate at a substantially constant speed reduction ratio.

Referring to FIGURE 7 in more detail, the modified speed reducer 100 is maintained within a protective casing 101, and is provided with an input shaft 120 and an output shaft 130. Thrust bearings 103 are provided to maintain the shafts 120 and 130 in their proper positions. A suitable electric motor or the like (not shown) can be positioned within the rearward portion 102 of the casing 101 for driving the input shaft 120 at the desired input speed.

As in the embodiment previously described with reference to FIGURES 1 through 6, the reducer 100 is provided with a drive mechanism 140 which includes an elastically deformable plate 150 and a relatively rigid transmission member 160. In addition, the plate 150 similarly defines a circumferential working area 151 which is engageable with an annular contact surface 161 on the adjacent portion of the transmission member 160. In this embodiment, the annular contact surface 161 is inclined or canted with respect to the axis of the member 160 to minimize the bending stresses experienced by the plate 150 when deformed into engagement with the surface 161. The plate 150 therefore can be deformed through a greater deflection than the plate 50 of the previously-described embodiment, and the speed reduction range of the speed reducer 100 (F' in FIGURE 7) can be extended to include lower speed reduction ratios.

The drive mechanism 140 in this embodiment further includes a pressure wave generator 300 for bringing the plate 150 into engagement with the contact surface 161. The pressure generator 300 comprises a planetary member 170, a rotating retainer member 171, and diametrically opposed rollers 172. As seen from FIGURE 7, the rollers 172 and the roller-engaging surface 173 on the planetary member 170 are also inclined within the housing 101 at an angle corresponding to the inclination of the canted contact surface 161 on the transmission member 160. The longitudinal force created by the planetary member 170 will thereby be transmitted by the rollers 172 to the plate 150 in a direction substantially normal to the inclined contact surface 161.

In this embodiment, the engagement between the deformed plate 150 and the stationary contact surface 161, induced by the rotating rollers 172, will occur along an entire face 174 of each roller 172. The pitch diameter $D_p$ of the plate 150 and the fixed contact diameter $D_c$ of the surface 161 at which the plate 150 and surface 161 engage is therefore measured from the center of the roller face 174, as seen in FIGURE 7.

Since the deformable plate 150 is constantly subjected to bending stresses during the operation of the speed reducer 100, it has been found that the torque-transmitting characteristics of the plate 150, and its useful service life, can be increased by minimizing the points on the plate at which stress concentration can occur. For instance, in the embodiment illustrated in FIGURE 2, stress concentration is likely to occur at the points where the rivets 52 engage with the central portion 51 of the plate 50. Thus, in the embodiment illustrated in FIGURE 7, such fastening means are eliminated, and the plate 150 is loosely mounted on the shaft 155. A retaining flange 156 is fixed to this shaft 155, and is provided with a convex surface 157 which frictionally engage with the plate 150 to maintain the plate in the desired longitudinal position. In addition, the shaft 155 and the flange 156 can be longitudinally shifted to vary the extent of deformation of the plate 150 in the same manner as previously described with reference to the plate 50 shown in FIGURE 2. To accomplish this longitudinal shifting of the plate 150, one end of the shaft 155 is provided with a threaded portion 104 which engages with corresponding threads on the housing portion 105, as seen from FIGURE 7. The housing portion 105 also includes a set screw 159 which limits the shifting movement of the shaft 155, and thereby defines the range F' within which the plate 150 can be deformed.

Accordingly, the deformable plate 150 is not secured to either the input shaft 120 or the output shaft 130. Instead, the plate 150 is held from rotation by being provided with peripheral gear teeth 180 which engage with teeth 181 of an adjacent internal ring gear 182 provided within the housing 101. The co-operating teeth 180 and 181 are designed so that they can slide with respect to each other, from an engaged condition to a disengaged condition, when the plate 150 is deformed. As shown in FIGURE 9, the teeth 180 on undeformed segments 150' of the plate 150 will thus remain in engagement with the adjacent stationary ring gear teeth 181, and prevent the rotation of the plate 150 during the speed reducing operation. This arrangement of the plate 150 minimizes the bending stresses to which the plate 50 is subjected by eliminating any members which constrain the axial movement and deflection of the plate. The stress on the plate 150 created by the torque of the rotating rollers 172 is also minimized by this arrangement, since the resulting torque forces on the plate 150 will be distributed along a substantial peripheral portion of the plate by the engagement between the gear teeth 180 and the gear teeth 181.

As further illustrated in FIGURE 7, the transmission member 160 of the speed reducer 100 is in the form of an annular ring, and is mounted for rotation within the reducer housing 101 on a hub 131 of the output shaft 130. More particularly, the ring-shaped member 160 is loosely telescoped over the hub 131 so that it can rotate with respect to the hub 131 and the output shaft 130. A bellville-type spring washer 132 is provided between the hub 131 and the member 160 to urge the member into constant engagement with the adjacent deformable plate 150. The output shaft hub 131 also includes an integral flange 133 extending radially from the hub 131 adjacent the transmission member 160.

This speed reducer 100 is also provided with pressure-regulating means 200 joining the ring-shaped transmission member 160 and the output shaft 130 for mutual rotation. In this regard, the adjacent surfaces of the member 160 and the output flange 133 are provided with conical pockets 165 and 135, respectively. As shown in FIGURES 7 and 8, these prockets 165 and 135 are circumferentially spaced around the axis of the reducer output shaft 130, and are normally located in longitudinally-opposed positions. Each pair of opposed conical pockets 165 and 135 can therefore receive a connecting ball 190.

In this embodiment, the balls 190 are carried in the desired position by a ball retainer 191 positioned between the member 160 and the output shaft flange 133.

The operation of the speed reducer 100 is substantially the same as the operation of the previously-described speed reducer 20. Likewise, the resulting speed reduction ratios are derived in the same manner by the comparison of the pitch diameter $D_p$ of the plate 150 with the fixed diameter $D_c$ of the contact surface 161. However, the inclination of the contact surface 161, as seen in FIGURE 7, has changed the speed reduction ratio range of the reducer 100, as compared to the reducer 20. More particularly, this inclined contact surface 161 prevents the plate 150 from being moved to an undeflected position. The inclined surface 161 thus assures that the upper limit of the possible speed reduction ratio for the reducer 100 is a finite value, as compared to the infinite value for the speed reducer 20. In addition, the inclination of the contact surface 161 permits the plate 150 to be readily deformed by the rollers 172 to a greater extent than the plate 50 in the previously-described reducer 20. Hence, the reducer 100 can be employed to transmit torque at lower speed reduction ratios than the reducer 20.

For example, permissible reduction ratios for the speed reducer 20, as illustrated in FIGURES 1 through 6, range from a maximum speed reduction of infinite value to a minimum reduction of approximately 200 to 1. In contrast, the permissible speed reduction ratios for the reducer 100, shown in FIGURES 7 through 10, range from a maximum reduction of approximately 300 to 1, to a minimum reduction of approximately 60 to 1.

To begin the operation of the speed reducer 100, the deformable plate 150, as shown in FIGURE 7, is shifted axially within the housing 101 by the shaft threads 104 until the pitch diameter $D_p$ differs with respect to the fixed contact diameter $D_c$ in an amount necessary to produce the desired speed reduction ratio. Then, the input shaft 120 and the connected planetary member 170 are rotated at the desired input speed, and thereby cause the retainer member 171 and the rollers 172 to rotate within the housing 101 at substantially one-half the input speed. As previously described, the orbiting rollers 172 then deflect the plate 150, and generate a rotating longitudinal pressure wave which forces successive segments of the plate 150 into engagement with the adjacent rotatable transmission member 160.

In this embodiment, the rollers 172 also function to disengage the gear teeth 180 on the plate 150 from the stationary teeth 181 at the deflected portions of the plate 150. However, the teeth 180 and 181 remain engaged along the undeflected segments 150' of the plate 150, as seen from FIGURE 8, and thereby prevent the plate 150 from rotating within the housing 101. As a result, the pressure wave generated by the orbiting rollers 172 will force the non-rotatable plate 150 into engagement with the transmission member 160 and create a reaction torque which causes the ring-shaped member 160 to rotate in a direction opposite the direction of rotation of the input shaft 120.

As seen from FIGURE 7, the reaction torque induced by the rollers 172 will tend to rotate the ring-shaped transmission member 160 with respect to the output shaft flange 133, especially if the static load on the output shaft 130 is substantial. However, as seen in FIGURE 10, the connecting balls 190 of the pressure regulator 200 will resist any relative translation between the member 160 and the flange 133, and will transmit the rotation of the member 160 to the output shaft 130. Thus, the reaction torque on the member 160 drives the output shaft 130 in a direction opposite to the direction of rotation of the input shaft 120, at a reduced speed which is determined by the selected speed reduction ratio.

As further seen in FIGURE 10, the connecting balls 190 will ride up the conical sides of the pockets 135 and 165, and force the member 160 and the flange 133 in opposite longitudinal directions, when a torque force is applied to the member 160. Since the thrust bearings 103 restrain the output shaft 130 from axial movement, this resulting longitudinal force of the connecting balls 190 will be concentrated on the transmission member 160, and will thereby urge the member 160 longitudinally toward the deformable plate 150.

By such an arrangement, the contact pressure between the plate 150 and the member 160 at the annular contact surface 161 will be substantially increased as the torque resistance on the output shaft 130 increases. The pressure regulator 200 therefore assures that this contact pressure is sufficient to prevent any substantial slippage between the plate 150 and the transmission member 160 during the speed reducing operation. The speed reducer 100 will therefore transmit torque from the input shaft 120 to the output shaft 130 at a substantially constant selected speed reduction ratio, despite variations in the torque load on the output shaft 130.

Of course, it will be appreciated by those skilled in the art that the various ranges for the speed reduction ratios of a speed reducer in accordance with this invention can be readily changed by adapting the speed reducer to satisfy particular applications. It will also be apparent that the above-described pressure-generating balls 60 and the rollers 172 can be replaced by other suitable pressure-generating means, such as by cams or sliding shoes and the like.

Furthermore, while the above embodiments of this infinitely variable speed reducer are considered to be preferred, it will be appreciated by those skilled in the art that various modifications of the functions and features of the speed reducer could be made without departing from the scope of this invention, as defined by the appended claims.

What is claimed is:

1. A speed reducer mechanism for transmitting the rotation of a rotatable input means to a rotatable output means at a reduced speed, said reducer comprising a first transmission member having an annular contact surface, a second transmission member comprising a plate arranged adjacent said annular contact surface, said plate defining a deformable circumferential working area engageable with said contact surface, retaining means to space said working area from said contact surface, a pressure wave generator energized by said input means and operable to propagate a rotating pressure wave which deflects successive segments of said circumferential working area into engagement with said contact surface to cause said circumferential working area of said plate to engage with and travel along a circular path of differing circumferential length on said contact surface and thereby rotate one of said transmission members with respect to the other transmission member at a reduced speed, and means connecting said transmission member rotating at a reduced speed to said rotatable output means.

2. The invention according to claim 1 wherein said first transmission member is restrained from rotation, and wherein said plate comprises said rotating transmission member rotating at a reduced speed connected to said output means.

3. The invention in accordance with claim 1 wherein said plate is restrained from rotation, and wherein said first transmission member is joined for rotation with said output means.

4. The invention according to claim 1 wherein said retaining means is selectively adjustable to change the extent of said deflection of said working area by said pressure generator within a predetermined range to vary the circumferential length of said working area along which said working area engages said contact surface, whereby the speed of said output means is infinitely variable within said range of deflection of said plate.

5. The invention according to claim 1 wherein said speed reducer mechanism includes means to increase the contact pressure between said working area of said plate and said annular contact surface of said first transmission member in response to an increase in the rotational resistance of said output means.

6. A speed reducer comprising, rotatable input and output means, a first transmission member defining a relatively rigid annular contact surface, a second transmission member comprising a deformable disc coaxially arranged with respect to said contact surface, said disc defining a deformable circumferential working area adjacent said contact surface, retaining means to space said working area of said disc from said contact surface, a pressure wave generator joined for rotation with said input means and operable engageable with said disc to deflect a segment of said circumferential working area into engagement with said annular contact surface, said deflection of said disc causing said disc and said contact surface to engage along circular paths of differing circumferential lengths, said generator being further operable to propagate a rotating pressure wave deflecting successive segments of said circumferential working area into engagement with said contact surface as said generator is rotated by said input means and cause said disc to engage with and travel along said differing circumferential length on said contact surface, and thereby rotate one of said transmission members with respect to the other transmission member, and means joining said one rotating transmission member to said output means.

7. A speed reducer in accordance with claim 6 wherein said pressure wave generator comprises rolling means positioned in engagement with said disc around said circumferential working area, and wherein said rolling means is operably joined to said input means for rotation around said circumferential working area.

8. The invention in accordance with claim 7 wherein said rolling means is joined to said input means by a planetary connection which rotates said rolling means about said circumferential working area of said disc at a speed reduced with respect to the speed of said input means.

9. The invention in accordance with claim 7 wherein said rolling means comprises a pair of diametrically opposed rollers.

10. A speed reducer in accordance with claim 6 wherein said means retaining said working area of said disc spaced from said contact surface is selectively adjustable to vary the extent of said deflection of said working area by said generator within a predetermined range of deflection to vary the circumferential length of said working area engageable with said contact surface, whereby said speed reducer is infinitely variable within said range.

11. The speed reducer according to claim 6 wherein said reducer includes means to restrain said first transmission member from rotation, and wherein said disc is operably joined for rotation with said output means.

12. The speed reducer according to claim 6 wherein said reducer includes means to restrain said disc from rotation and wherein said first transmission member is operably joined for rotation with said output means.

13. A speed reducer comprising, rotatable input and output means, a first transmission member defining a relatively rigid annular contact surface, a second transmission member comprising an elastically deformable disc coaxially arranged with respect to said contact surface, said disc defining a deformable circumferential working area adjacent said contact surface, means to movably retain the central portion of said disc axially spaced from said annular contact surface, means joining said central portion of said disc to said rotatable output means, a pressure wave generator comprising roller means positioned in engagement with said disc adjacent said circumferential working area and joined to said input means for rotation around said disc adjacent said circumferential working area to deflect successive segments of said working area into engagement with said annular contact surface and cause said disc to engage with and travel along said annular contact surface and thereby rotate said disc with respect to said annular contact surface at a speed reduced from the speed of said input means.

14. A speed reducer comprising, rotatable input and output means, a rotatable first transmission member defining an annular contact surface, a second transmission member comprising an elastically deformable disc coaxially arranged with respect to said annular contact surface, means to restrain said disc from rotation, means to movably retain the central portion of said disc axially spaced from said contact surface, a pressure generator comprising roller means positioned in engagement with said disc adacent said contact surface and joined to said input means for rotation around said disc adjacent said working area to deflect successive segments of said working area into engagement with said contact surface, said pressure generator causing said disc to engage with said contact surface along circular paths of different circumferential length and causing said first transmission member to rotate with respect to said disc at a speed reduced from the speed of said input means, and connecting means joining said first transmission member to said rotatable output means.

15. The invention according to claim 14 wherein the periphery of said disc includes a plurality of grooves and wherein said reducer further includes stationary splines positioned for engagement with said grooves so that said grooves and said splines restrain said disc from rotation.

16. The invention according to claim 14 wherein said connecting means joining said first transmission member to said output means comprises a set of connecting rollers engaged between said first transmission member and said output means to transmit rotation from said first transmission member to said output means.

17. The invention according to claim 16 wherein said connecting rollers are engaged between said first transmission member and said output means in opposed inclined pockets provided in said first transmission member and said output means and wherein said connecting rollers engage with said opposed inclined pockets to transmit axial pressure against said first transmission member urging said first transmission member toward said working area of said disc.

18. The invention according to claim 14 wherein said annular contact surface is inclined in a longitudinal direction with respect to said disc.

References Cited

UNITED STATES PATENTS

| Re. 25,579 | 5/1964 | Sacchi | 74—796 |
|---|---|---|---|
| 2,906,143 | 9/1959 | Musser | 74—640 |
| 2,948,165 | 8/1960 | Luthi | 74—804 |
| 3,117,468 | 1/1964 | Musser | 74—640 |
| 3,119,283 | 1/1964 | Bentov | 74—640 |
| 3,169,202 | 2/1965 | Proctor et al. | 310—83 |
| 3,178,963 | 4/1965 | Musser | 74—640 |
| 3,187,605 | 6/1965 | Stiff | 74—640 |
| 3,190,145 | 6/1965 | Bradley | 74—640 |
| 3,199,370 | 8/1965 | Prior | 74—640 |

MILTON KAUFMAN, *Primary Examiner*

CORNELIUS J. HUSAR, *Assistant Examiner.*

UNITED STATES PATENT OFFICE
CERTIFICATE OF CORRECTION

Patent No. 3,367,198                            February 6, 1968

Henry Schottler

It is certified that error appears in the above identified patent and that said Letters Patent are hereby corrected as shown below:

In the drawings, Sheet 1, the dimension $d_c$ in Figure 5 should be extended upwardly to conform with the same dimension illustrated in Figure 4. This $d_c$ dimension represents a constant diameter for the orbiting balls 60, and should appear as the same dimension in Figures 4 and 5. Column 6, line 14, "engage" should read -- engages --; line 71, "prockets" should read -- pockets --. Column 8, line 59, after "speed" insert -- and --. Column 9, line 27, cancel "one"; line 28, after "member" insert -- rotating at a reduced speed --.

Signed and sealed this 17th day of February 1970.

(SEAL)
Attest:

Edward M. Fletcher, Jr.
Attesting Officer

WILLIAM E. SCHUYLER, JR.
Commissioner of Patents